United States Patent Office 3,114,528
Patented Dec. 17, 1963

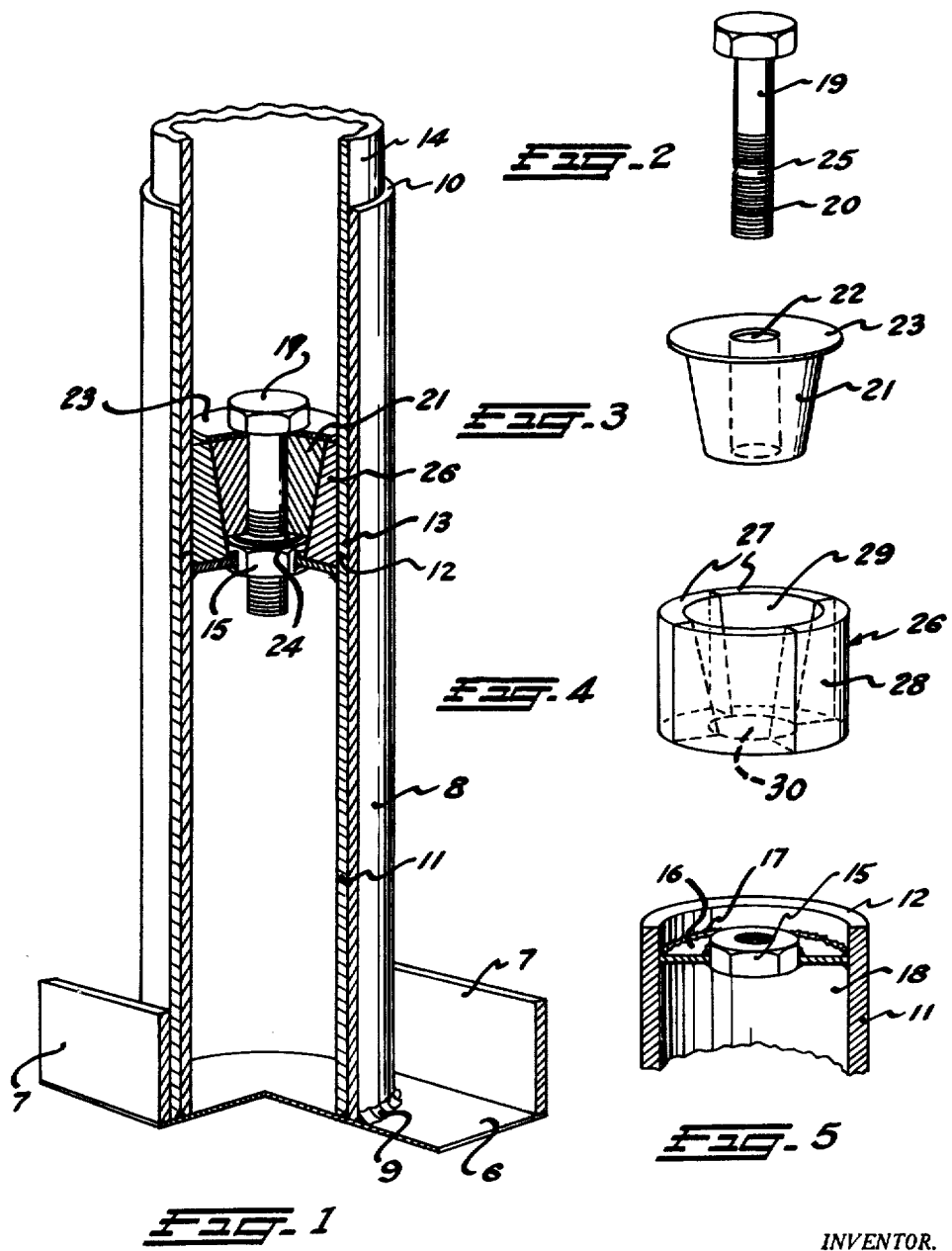

3,114,528
BASE AND LOCK ASSEMBLY FOR PIPE
Lester W. Forest, 9905 E. 122nd St., Puyallup, Wash.
Filed Nov. 7, 1962, Ser. No. 236,049
3 Claims. (Cl. 248—158)

This invention relates generally to coupling mechanisms, and more specifically to an improved coupling mechanism for use in the assembly of parking meters, highway signs and like cylindrical pipe support structures.

Stand pipes used for parking meters and highway signs frequently become damaged and bent due to traffic accidents. The repair and replacement of such damaged supports is both costly and time consuming, and presently involves a minimum of six hours of labor. My invention is directed towards the provision of a novel base structure which is adapted to removably receive pipe standards of this class, and is further adapted with novel means for locking the standards in position.

It is therefore a primary object of this invention to provide a base of novel construction for the purpose of receiving and retaining a vertical pipe standard in such a manner that the standard may readily be removed or replaced.

It is a further object of this invention to provide a base and lock assembly for pipe structure which is simple in design, effective in operation, and provides substantial improvement over the present method used in the mounting of parking meters, highway signs, and like vertical standards.

Briefly, my invention involves the provision of a base plate to which is welded an upstanding pipe of relatively short length. A pipe section having the same diameter as the standard to be inserted therein is welded in the lower section of the outer pipe and is provided with an axially supported nut positioned in an upper portion thereof. A cylindrical stand pipe is slideably received in the upper end of the outer pipe and abuts with the upper end of the short pipe section disposed therewithin. A locking bolt which cooperates with a conical wedge and expanding sleeve is engaged in the nut such that upon tightening the bolt the standards become removably secured in position.

A full understanding of the construction of this invention, together with further novel features and advantages, will be had from the following detailed description of a preferred embodiment thereof, taken in conjunction with the attached drawings wherein:

FIG. 1 is a perspective view of the base and lock assembly shown partly in cross section.

FIG. 2 is a perspective view of the bolt which is utilized in locking the stand pipe in position.

FIG. 3 is a perspective view of the conical wedge and washer assembly.

FIG. 4 is a perspective view of a segmented expanding sleeve for cooperation with the wedge.

FIG. 5 is a fragmentary perspective cross sectional view showing the mounting of the hold down nut in the base assembly.

Similar reference characters indicate corresponding parts throughout the several views in the drawings.

Referring now to the drawings in detail, the numeral 6 represents a base plate which is provided with upstanding side ribs 7 for suitable anchorage beneath the ground level. A short length of outer pipe 8 is welded at 9 to upstand normally and centrally of the base plate 6. The outer pipe terminates with a circular edge 10 disposed above ground level. A short sleeve 11 which is adapted to fit the bore of the pipe 8 is welded within the lower end of the said pipe to provide a terminating abuting edge 12 for the lower end 13 of a tubular pipe standard 14. A lock nut 15 is welded in the centre of a circular washer 16, and the washer is welded around its periphery at 17 to the inner circumference 18 of the short sleeve 11 and inwardly spaced from the upper edge 12 thereof.

A removable locking wedge is shown in detail in FIGS. 2, 3 and 4, and consists of a bolt 19 which is threaded at one end 20. A conical wedge 21 has a concentric bore 22 formed therethrough to freely receive the bolt. A washer 23 is mounted on the upper end of the wedge 21, and the assembly is removably retained on the bolt by means of a retaining ring 24 which is received in an annular ring groove 25 formed in the bolt 19. An expanding sleeve 26 comprises four segments 27 having a cylindrical outer surface 28 and a conical inner surface 29 which is adapted to wedgingly receive the conical wedge 21 therein. The opening 30 formed by the combined segments 27 is of sufficient diameter to clear the upper end of the lock nut 15 such that the base of the expanding sleeve abuts against the upper surface of the washer 16.

The operation of this locking device is believed to be quite clear from the above description. A cylindrical stand pipe or standard 14 is slid into the upper end of the outer pipe 8 so as to abut with the top 12 of the short sleeve 11. The locking assembly comprising the expanding sleeve 26, the conical wedge 21, and the bolt 19, is inserted down the pipe, and with the use of a suitable extension and socket the bolt is engaged with the lock nut 15 and the expanding sleeve is suitably expanded to tightly engage against the inner periphery of the pipe standard and thereby lock the same in position within the outer pipe 8. This mechanism cannot be tampered with in any way and yet enables a damaged standard to be simply removed for replacement when required.

Having described the invention with considerable particularity, it should be understood that various modifications may be made to the precise detail thereof, without departing from the scope or spirit of the invention, as defined in the appended claims.

I claim:

1. A base and locking assembly for mounting tubular pipe standards, and comprising, a base plate, an outer pipe upstanding normally from said base, a short sleeve received in a lower portion of the outer pipe and secured thereto, a lock nut mounted concentrically within said sleeve, a pipe standard slideably engaging in the upper end of the outer pipe and abutting with said sleeve, and a removably expanding locking mechanism received within the standard for threaded cooperation with the lock nut to lock said standard in position.

2. A base and locking assembly for mounting a tubular standard, and comprising, a base plate, ribs upstanding from the sides of the base plate, a short outer pipe secured to project normally from the centre of the base plate, a short sleeve received in a lower portion of said outer pipe and secured to said base plate, a lock nut secured concentrically within the short sleeve and inwardly spaced from the upper end thereof, a pipe standard slideably received in the upper end of the outer pipe for abutment against said short sleeve, and a locking mechanism including an expanding sleeve removably received within the pipe standard to cooperate with the lock nut and lock the standard in position.

3. A base and locking assembly for mounting a tubular standard, and comprising, a base plate, ribs upstanding from the sides of the base plate, a short outer pipe secured to project normally from the centre of the base plate, a short sleeve received in a lower portion of said outer pipe and secured to said base plate, a lock nut secured concentrically within the short sleeve and inwardly spaced from the upper end thereof, a pipe standard slideably received in the upper end of the outer pipe for abutment against said short sleeve, a bolt, a conical wedge received on the bolt, a retaining ring for retaining the wedge on said bolt, a segmented expansion sleeve having an inner conical surface for cooperating with said wedge, said sleeve adapted to expand radially within the standard in response to threading said bolt into the lock nut.

References Cited in the file of this patent

UNITED STATES PATENTS

| 1,758,924 | Blakeslee | May 20, 1930 |
| 2,523,513 | Oliver et al. | Sept. 26, 1950 |
| 2,947,556 | Wenger | Aug. 2, 1960 |